United States Patent
Young et al.

(10) Patent No.: US 11,169,091 B2
(45) Date of Patent: Nov. 9, 2021

(54) SURFACE ENHANCED LUMINESCENCE ANALYTE INTERROGATION STAGE SHIPPING AND STORAGE PACKAGE

(71) Applicant: HEWLETT-PACKARD DEVELOPMENT COMPANY, L.P., Houston, TX (US)

(72) Inventors: Christopher N. Young, Corvallis, OR (US); Milo Overbay, Corvallis, OR (US); Anita Rogacs, Palo Alto, CA (US); Raghuvir N. Sengupta, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 596 days.

(21) Appl. No.: 16/082,399

(22) PCT Filed: Jul. 20, 2017

(86) PCT No.: PCT/US2017/042950
§ 371 (c)(1),
(2) Date: Sep. 5, 2018

(87) PCT Pub. No.: WO2019/017945
PCT Pub. Date: Jan. 24, 2019

(65) Prior Publication Data
US 2021/0181104 A1  Jun. 17, 2021

(51) Int. Cl.
*G01N 1/10* (2006.01)
*G01N 21/552* (2014.01)
*G01N 21/64* (2006.01)
*G01N 21/65* (2006.01)

(52) U.S. Cl.
CPC ......... *G01N 21/554* (2013.01); *G01N 21/648* (2013.01); *G01N 21/658* (2013.01)

(58) Field of Classification Search
CPC .... G01N 21/05; G01N 21/03; G01N 21/0303; G01N 30/74; G01N 21/031
USPC ......................................... 356/246
See application file for complete search history.

(56) References Cited

U.S. PATENT DOCUMENTS

| | | | |
|---|---|---|---|
| 7,542,132 B2 | 6/2009 | Fang et al. |
| 7,879,625 B1 | 2/2011 | Boss |
| 8,184,284 B2 | 5/2012 | Ebstein |
| 8,917,389 B2 | 12/2014 | Piorek et al. |
| 2010/0215543 A1 | 8/2010 | Henry et al. |

(Continued)

FOREIGN PATENT DOCUMENTS

WO  WO-2017184134 A1 * 10/2017 ........... G01N 21/658

OTHER PUBLICATIONS

Horimoto et al., "Preparation of a SERS Substrate Using Vacuum-Synthesized Silver Nanoparticles", Chemical Physics Letters, vol. 413, Issue No. 1-3, Retrieved from internet—https://www.researchgate.net/publication/223185707_Preparation_of_a_SERS_substrate_using_vacuum-synthesized_silver_nanoparticles, Sep. 15, 2005, pp. 78-83.

*Primary Examiner* — Md M Rahman
(74) *Attorney, Agent, or Firm* — Tong Rea Bentley & Kim LLC (57) ABSTRACT

A surfaced enhanced luminescence analyte interrogation stage shipping and storage package may include a sealed chamber, a liquid contained within the sealed chamber and nano pillars within the sealed chamber and submersed within the liquid. The nano pillars comprise polymer posts and metallic caps forming tips of the nano pillars.

14 Claims, 6 Drawing Sheets

(56) References Cited

U.S. PATENT DOCUMENTS

| | | | |
|---|---|---|---|
| 2011/0290005 A1* | 12/2011 | Hart | A61B 5/0071 |
| | | | 73/37.9 |
| 2012/0200851 A1* | 8/2012 | Wu | G01N 21/658 |
| | | | 356/301 |
| 2015/0065390 A1 | 3/2015 | Bratkovski et al. | |
| 2015/0316465 A1 | 11/2015 | Mourey et al. | |
| 2016/0067666 A1 | 3/2016 | Walavalkar et al. | |
| 2017/0021355 A1* | 1/2017 | Olivier | B01L 3/563 |
| 2017/0050046 A1* | 2/2017 | Walder | A61K 41/17 |

* cited by examiner

SURFACE ENHANCED LUMINESCENCE ANALYTE INTERROGATION STAGE SHIPPING AND STORAGE PACKAGE

BACKGROUND

Surface enhanced luminescence (SEL) is sometimes used for analyzing the structure of inorganic materials and complex organic molecules. SELS focuses electromagnetic radiation or light onto an analyte or solution containing an analyte, wherein the interaction between the light and the analyte is detected for analysis.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Surface enhanced luminescence (SEL) may utilize an analyte interrogation stage comprising an array of pillars, each pillar being formed from a polymer post that supports a metallic cap. The polymer posts are bendable, facilitating closing of the metallic caps to form "hotspots" that enhance plasmon resonance and facilitate enhanced interrogation of an analyte. The polymer posts may be subject to outgassing during shipping and storage. The outgassing of the polymer materials of the posts may contaminate the metallic caps. Airborne contaminants may additionally contaminate the metallic caps. Contamination of the metallic caps and their degradation reduces adsorption of an analyte on the active surfaces provided by the metallic caps. Contamination of the metallic caps may further reduce the presence of conductive electrons which form plasmon resonance.

Disclosed herein are example surfaced enhanced luminescence (SEL) analyte interrogation stage shipping and storage packages that protect the metallic caps of the pillars from contamination during shipping and storage. The packages immerse the metallic caps in a liquid that inhibits airborne contaminants from contaminating the metallic caps. The packages are further hermetically sealed to inhibit airborne contaminants from entering the liquid and contaminating the metallic caps.

In some implementations, the liquid in which the metallic caps of the pillars are immersed has properties such that it may be directly mixed with the analyte to facilitate adsorption of the analyte onto the metallic caps when the interrogation stage is to be used. The seal of the package is broken or removed and the analyte is added to the existing liquid in which the metallic caps are immersed.

In some implementations, the liquid in which the metallic caps of the pillars are immersed is removable from the package, wherein a second liquid containing analyte is deposited within the package to adsorb analyte onto the metallic caps of the pillars. In one implementation, the analyte is mixed with the second liquid prior to submersing the pillars in the second liquid. In another implementation, the metallic caps of the pillars are immersed in the second liquid and an analyte is then added to the second liquid.

In some implementations, the liquid in which the metallic caps of the pillars are immersed during shipping and storage has properties such that a chemical agent, such as a chemical polishing agent, may be added to the liquid when the analyte interrogation stage is being prepared for use. The seal of the package is broken or removed and the chemical polishing agent is added and mixed into the liquid. The chemical polishing agent removes a portion of the metallic caps, an outer layer or layers of the metallic caps, whereby the metallic caps are polished. Thereafter, the liquid with the chemical polishing agent is removed and the polished metallic caps of the pillars are immersed within a second liquid containing an analyte. Such polishing of the metallic caps may enhance adsorption of analyte on the metallic caps.

In each of such example analyte interrogation stages, upon the analyte being adsorbed onto the metallic caps, the liquid containing the analyte is removed from the package. The liquid on the pillars is evaporated to draw or close the pillars towards one another through capillary forces. Upon closing of the pillars, the analyte interrogation stage with the adsorbed analyte is ready for interrogation by a laser or other light source. Examples of such interrogation techniques include surface enhanced Raman spectroscopy, surface enhanced hyper Raman scattering, surface enhanced fluorescence, surface plasmon resonance spectroscopy and localized surface plasmon resonance spectroscopy.

Disclosed herein is an example analyte interrogation stage preparation system that facilitates the automated preparation of an analyte interrogation stage for interrogation. The example analyte interrogation stage shipping and storage package utilized as part of the system may facilitate the automated polishing and rinsing of the metallic caps of the pillars followed by the automated removal and evaporation of liquids to close the pillars and their metallic caps to create "hotspots" for SEL interrogation. The system may comprise a package having reservoirs or ports along with pumps and valves that provide for the automated preparation of the analyte interrogation stage and the automated adsorption of analyte onto the prepared stage.

Disclosed is an example surfaced enhanced luminescence shipping and storage package that may comprise a sealed chamber, a liquid contained within the sealed chamber and nano pillars within the sealed chamber and immersed within the liquid. The nano pillars comprise polymer posts and metallic caps forming tips of the nano pillars.

Disclosed herein is an example method that may comprise immersing nano pillars in a liquid and sealing the immersed nano pillars within a sealed chamber of a surfaced enhanced luminescence analyte interrogation stage shipping and storage package. The nano pillars comprise polymer posts and metallic caps forming tips of the nano pillars.

Disclosed herein is an example analyte interrogation stage preparation system that may include a sealed chamber having an inlet and an outlet, a liquid contained within the sealed chamber, a plasmonic substrate immersed within the liquid and a sealed reservoir of a polishing liquid connectable to the inlet of the sealed chamber. The polishing liquid is to remove a portion of the plasmonic substrate to polish the plasmonic substrate.

Figure 1:
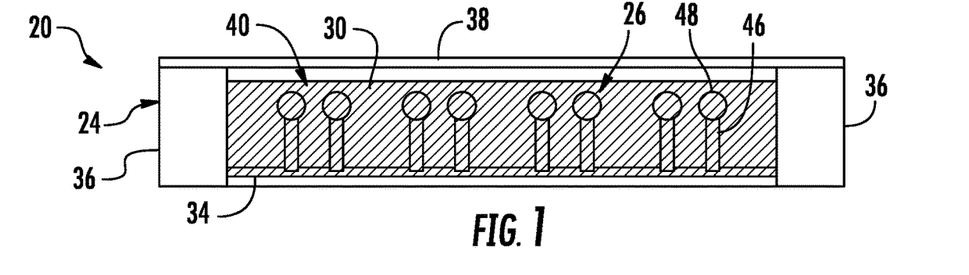
FIG. 1 is a side view schematically illustrating portions of an example sealed SEL analyte interrogation stage shipping and storage package.

FIG. 1 is a side view schematically illustrating portions of an example surfaced enhanced luminescence (SEL) shipping and storage package 20. Package 20 provides an SEL analyte interrogation stage for supporting analyte as the analyte is being interrogated by a laser or other light source for SEL analysis. Examples of SEL analysis techniques include, but are not limited to, surface enhanced Raman spectroscopy, fluorescence and surface plasmon resonance. Package 20 inhibits contamination of the plasmonic surfaces or substrates of the stage during shipping and storage prior to use. As a result, package 20 presents cleaner plasmonic surfaces for the adherence of the analyte when the analyte interrogation stage of package 20 is to be used.

Package 20 comprises sealed chamber 24, nano pillars 26 and liquid 30. Chamber 24 encloses nano pillars 26 and liquid 30. In the example illustrated, chamber 24 comprises floor 34, sidewalls 36 and cover 38. In one implementation, cover 38 is removable from sidewalls 36 when the analyte interrogation stage formed by pillars 26 is to be used. In one implementation, cover 38 may comprise a film that maybe peeled or torn away from sidewalls 24 or which may be punctured or otherwise opened to provide access to the interior of chamber 24. Cover 38 cooperates with floor 34 and sidewalls 36 to form a hermetically sealed enclosure containing pillars 26 and liquid 30.

Nano pillars 26, sometimes referred to as nano fingers, comprise columnar structures projecting from substrate 24. Pillars 26 form an array 40 across the surface of floor 34. Each of pillars 26 comprises a polymeric post 46 and a metallic cap 48 on and supported by the polymeric post 46.

In one implementation, such posts 46 have an aspect ratio of and at least 10:1 (a height of at least 10 times the thickness or diameter). In one implementation, such posts have a thickness or diameter between 50 nm and 100 nm, while, at the same time, having a height of at least 500 nm and, in one implementation, at least 700 nm. In some implementations, the posts 46 are movable and are self-actuating, wherein such columnar structures bend or flex towards one another in response to micro-capillary forces so as to self-organize, wherein such bending facilitates close spacing between the structures for greater scattered radiation intensity.

The polymer material from which posts 46 are formed facilitates the use of molding, imprinting or other fabrication techniques to form posts 46. The polymer material further facilitates bending and flexing of posts 46 and subsequent closing during use of package 20. Examples of polymer materials from which each post 46 may be formed include, but are not limited to, photo resists, hard mold resins such as PMMA, soft mold polymers such as PDMS, ETFE or PTFE, hybrid-mold cross-linked uv-curable or thermal-curable polymers based on acrylate, methacrylate, vinyl, epoxy, silane, peroxide, urethane or isocyanate. The polymer materials may be modified to improve imprint and mechanical properties with copolymers, additives, fillers, modifiers, photoinitiators and the like.

Metallic caps 48 comprise metallic structures formed on top of posts 36. Each metallic cap 48 comprises a metal material that enhances the intensity of electromagnetic radiation emitted as a result of the reaction of the analyte and the light impinging the analyte upon pillars 26. In one implementation, each metallic cap 48 comprises silver, gold, copper, platinum, aluminum, or combinations of these metals in the form of alloys or multilayer systems. In another implementation, each metallic cap 48 may comprise other metallic materials that provide such intensity enhancement.

Liquid 30 is contained within the interior of package 20 and submerses the metallic caps 48 of nano pillars 26. Liquid 30 is substantially devoid of elements or chemicals that may contaminate the metallic caps 48 or interact with materials of metallic caps 48 and posts 46 so as to degrade either posts 46 or caps 48 or produce chemicals that may contaminate metallic caps 48. Examples of liquid 30 include, but are not limited to, water, short-chain alcohols such as ethanol, isopropyl alcohol, and butanol, and short-chain hydrocarbons such as hexane.

Figure 2:
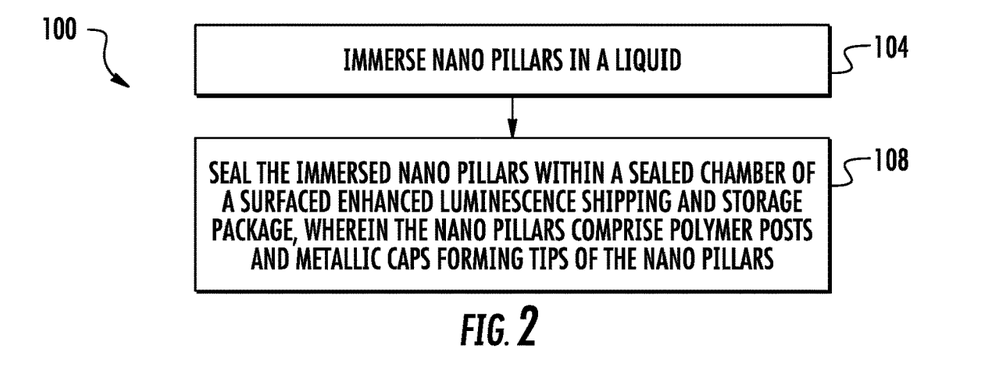
FIG. 2 is a flow diagram of an example method for forming an example SEL analyte interrogation stage shipping and storage package.

FIG. 2 is a flow diagram of an example method 100 for forming an SEL analyte interrogation stage shipping and storage package, such as package 20 described above. It should be appreciative that method 100 may be utilized to form other SEL analyte interrogation stage shipping and storage packages. As indicated by block 104, nano pillars, such as nano pillars 26, are immersed in a liquid, such as liquid 30. As indicated by block 108, the immersed nano pillars 26 are sealed within a sealed chamber of a surface enhanced luminescence shipping and storage package, such as within the sealed chamber 24. As described above with respect to package 20, the nano pillars 26 comprise polymer posts and metallic caps that form tips of the nano pillars 26. As described above with respect to package 20, the immersion of the nano pillars 26 within the liquid 30 inhibits contamination of metallic caps 48. The hermetic sealing of chamber 24 further inhibits contamination of metallic caps 48 during shipping and storage.

Figure 3:
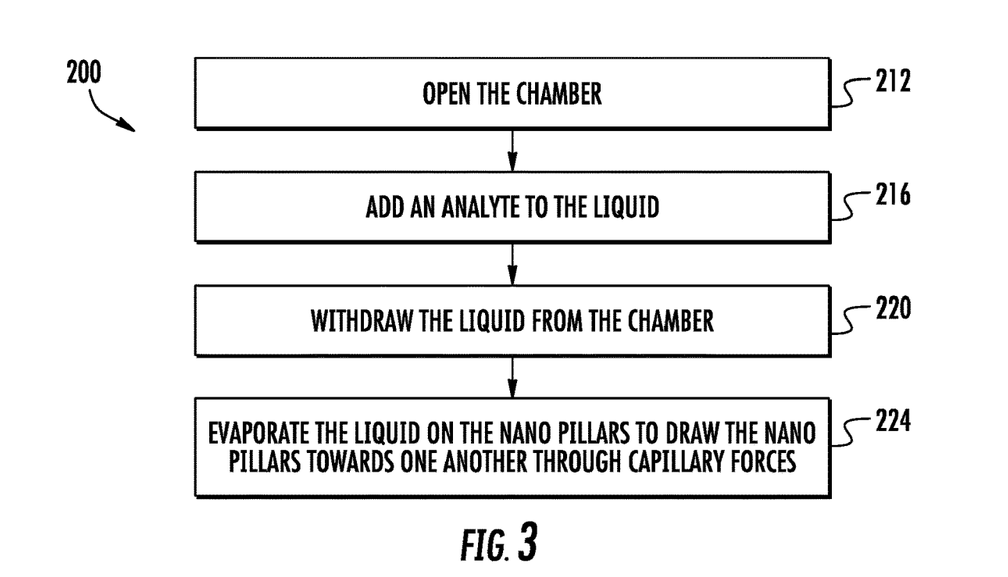
FIG. 3 is a flow diagram of an example method for preparing an example SEL analyte interrogation stage shipping and storage package for use.
Figure 4:
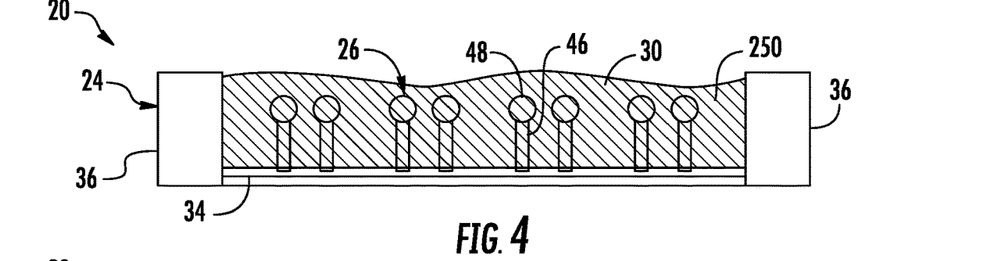
FIG. 4 is a side view of the example package of FIG. 1 following opening of the package and the addition of an analyte to liquid within the package.
Figure 5:
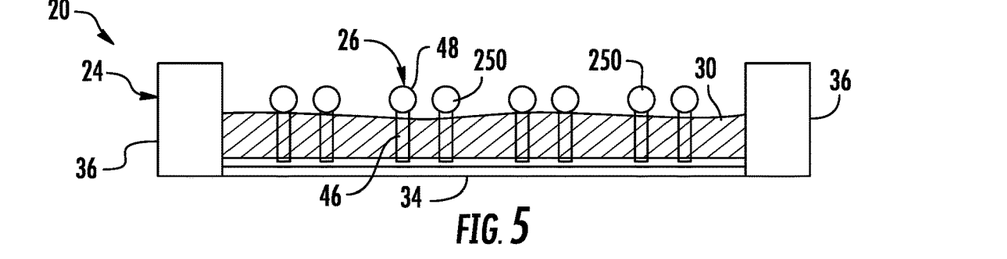
FIG. 5 is a side view of the example package of FIG. 1 during the withdrawal of the liquid from the package.
Figure 6:
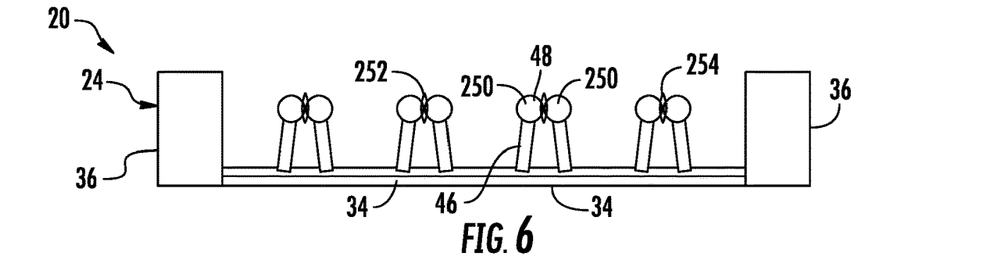
FIG. 6 is a side view of the example package of FIG. 1 illustrating closure of example nano pillars following evaporation of the liquid from the package.

FIG. 3 is a flow diagram of an example method 200 for preparing an SEL analyte interrogation stage shipping and storage package, such as package 20, for use in interrogating an analyte. FIGS. 4-6 illustrate method 200 being carried out with package 20 described above. As indicated by block 212 and illustrated by FIG. 4, chamber 24 is opened. In one implementation, cover 38 is sufficiently peeled away from sidewalls 36 to provide access to the interior chamber 24. In another implementation, cover 38 is cut, torn overlies severed from package 24 to provide access to the interior of chamber 24.

As indicated by block 216 and further illustrated by FIG. 4, an analyte 250 is added to the liquid, such as liquid 30. As indicated by block 220 and illustrated by FIG. 5, after allowing a sufficient time for analyte 250 within chamber 24 to adsorb to surfaces of metallic caps 48, the liquid 30 is withdrawn from chamber 24. As indicated by block 224 and illustrated by FIG. 6, upon withdrawal of liquid 30, any remaining liquid on the surface of nano pillars 26 is evaporated so as to cause posts 46 to bend towards one another under the influence of capillary forces, moving the respective metallic caps 48 into close proximity to one another so as to form "hotspots" 254 therebetween that provide enhanced response to the interrogating light during use of package 20.

Figure 7:
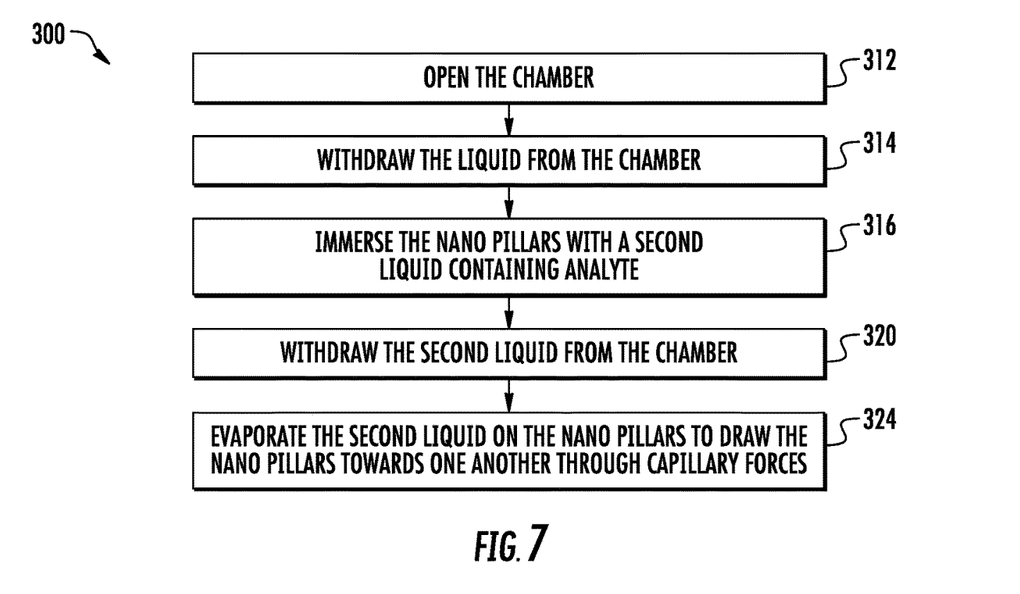
FIG. 7 is a flow diagram of an example method for preparing an example SEL analyte interrogation stage shipping and storage package.
Figure 8:
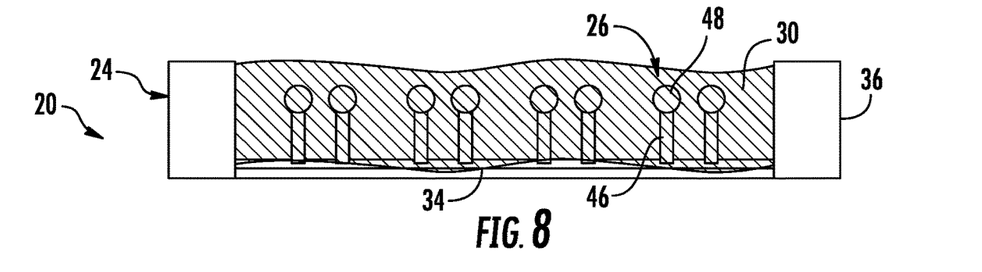
FIG. 8 is a side view of the example package of FIG. 1 following opening of the package.

FIG. 7 is a flow diagram of another example method 300 for preparing an SEL analyte interrogation stage shipping and storage package, such as package 20, for use in interrogating an analyte. FIGS. 8-12 illustrate method 300 being carried out with package 20 described above. As indicated by block 312 and illustrated by FIG. 4, chamber 24 is opened. In one implementation, cover 38 is sufficiently peeled away from sidewalls 36 to provide access to the interior chamber 24. In another implementation, cover 38 is cut, torn or otherwise severed from package 24 to provide access to the interior of chamber 24.

Figure 9:
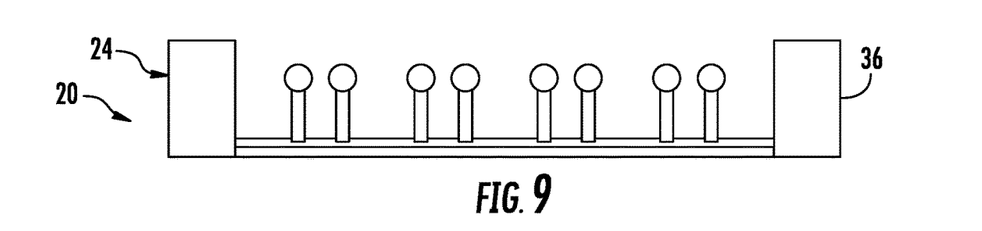
FIG. 9 is a side view of the example package of FIG. 1 following the removal of liquid from the package.
Figure 10:
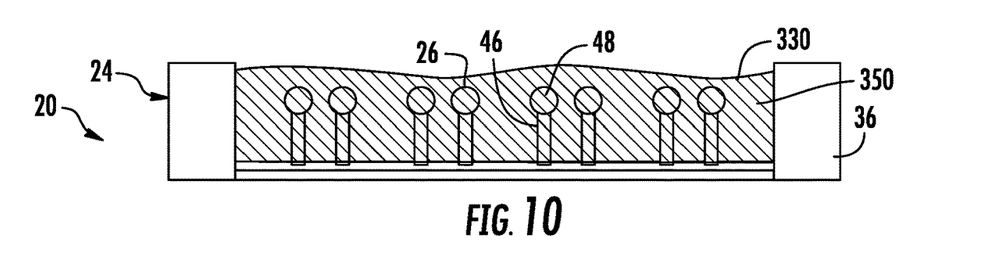
FIG. 10 is a side view of the example package of FIG. 1 following the addition of a second liquid containing an analyte to immersed nano pillars of the package.

As indicated by block 314 and further illustrated by FIG. 9, liquid 30 is withdrawn from the interior of chamber 24. As indicated by block 316 and illustrated by FIG. 10, nano pillars 26 are immersed within a liquid 330 which contains an analyte 350.

Figure 11:
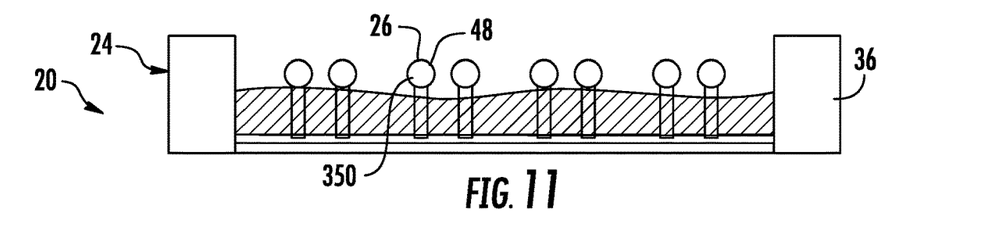
FIG. 11 is a side view of the example package of 1 during removal of the liquid and analyte.
Figure 12:
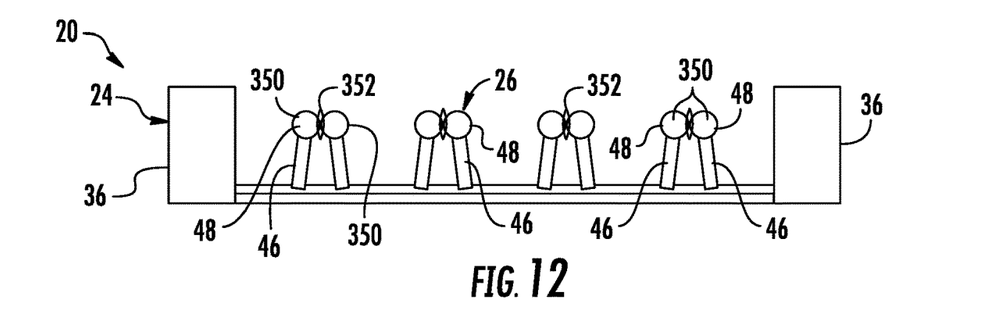
FIG. 12 is a side view of the example package of FIG. 1 illustrating closure of example nano pillars following evaporation of the liquid from the package.

As indicated by block 320 and illustrated by FIG. 11, after allowing a sufficient time for analyte 350 within chamber 24 to adsorb to surfaces of metallic caps 48, the liquid 330 is withdrawn from chamber 24. As indicated by block 324 and illustrated by FIG. 12, upon withdrawal of liquid 30, any remaining liquid on the surface of nano pillars 26 is evaporated so as to cause posts 46 to bend towards one another under the influence of capillary forces, moving the respective metallic caps 48 into close proximity to one another so as to form "hotspots" 254 therebetween that provide enhanced response to the interrogating light during use of package 20.

Figure 13:
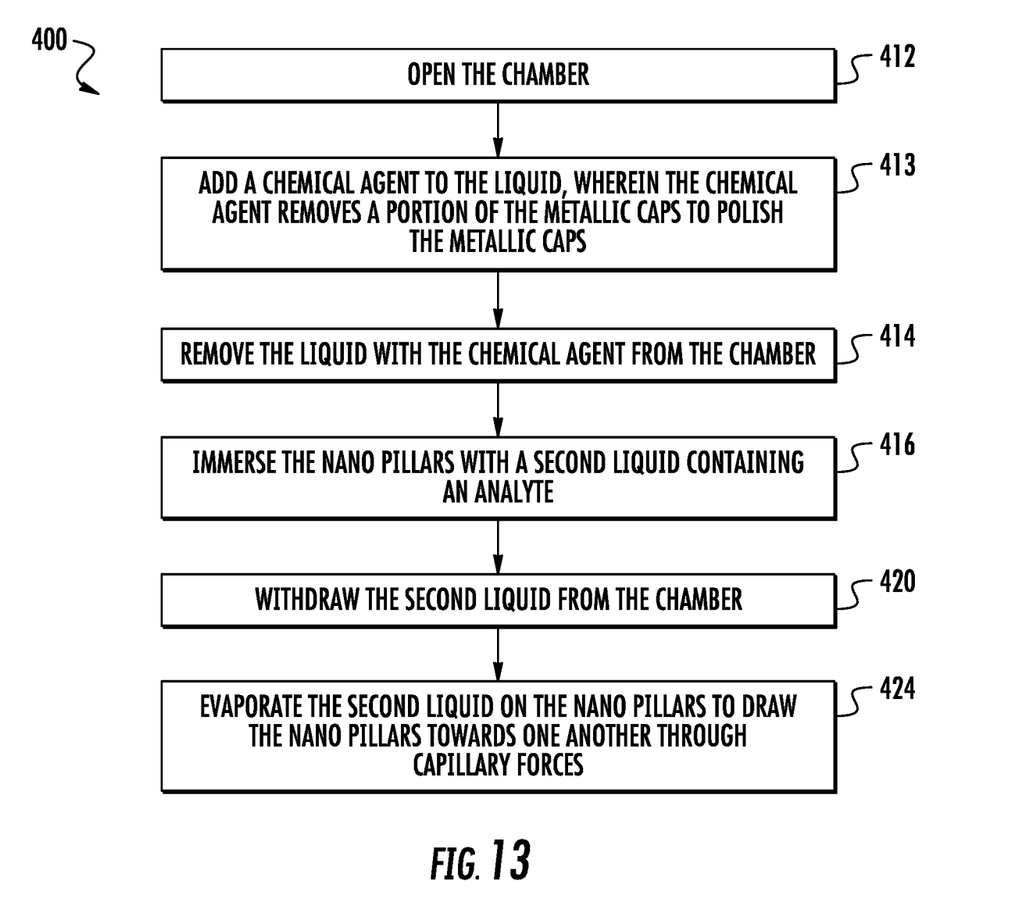
FIG. 13 is a flow diagram of an example method for preparing an example SEL analyte interrogation stage shipping and storage package for use.

FIG. 13 is a flow diagram of another example method 400 for preparing an SEL analyte interrogation stage shipping and storage package, such as package 20, for use in interrogating an analyte. FIGS. 14-18 illustrate method 400 being carried out with package 20 described above. As indicated by block 412 and illustrated by FIG. 14, chamber 24 is opened. In one implementation, cover 38 is sufficiently peeled away from sidewalls 36 to provide access to the interior chamber 24. In another implementation, cover 38 is cut, torn or otherwise severed from package 24 to provide access to the interior of chamber 24.

Figure 14:
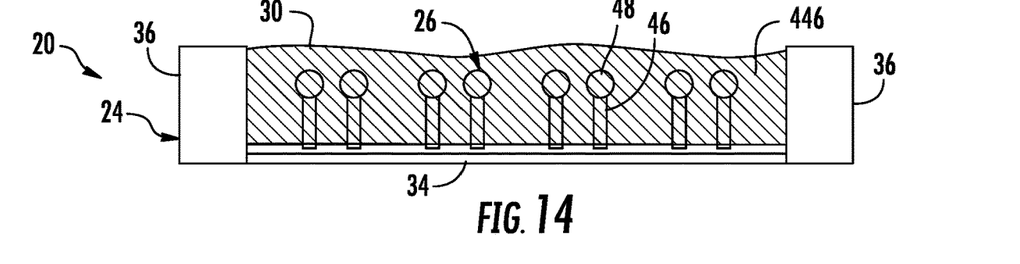
FIG. 14 is a side view of the example package of FIG. 1 illustrating opening of the package and addition of a chemical polishing agent to the liquid.

As indicated by block 413 and further illustrated by FIG. 14, a chemical agent 446 is added to liquid 30. The chemical agent may comprise a polishing agent that removes a portion of each of metallic caps 48, such as an outer layer or layers of metallic caps 48 to polish metallic caps 48. In one implementation, liquid 30 comprises water while the chemical agent, serving as a polishing agent, comprises a mixture of water, potassium iodide and iodine. In other implementations, other chemical agents may be utilized as polishing agent such as mixtures of water, potassium bromide and bromine.

Figure 15:
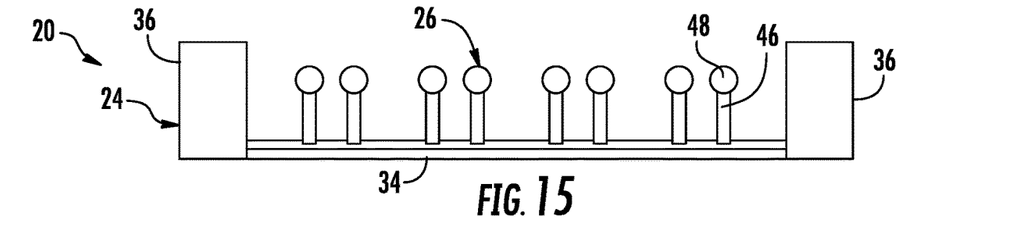
FIG. 15 is a side view of the example package of FIG. 1 illustrating the removal of the liquid and chemical polishing agent.

As indicated by block 414 and illustrated by FIG. 15, liquid 30 and the chemical agent 446 are withdrawn from the interior of chamber 24. In some implementations, nano pillars 26 may be additionally rinsed with a rinsing liquid (not shown) to further remove the chemical polishing agent from the surface of pillars 26.

Figure 16:
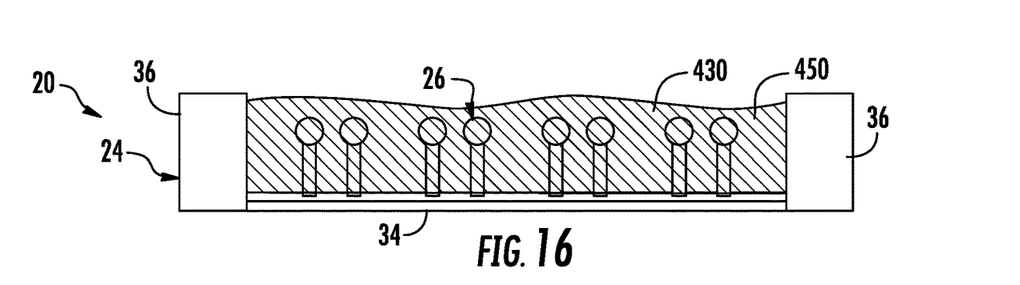
FIG. 16 is a side view of the example package of FIG. 1 illustrating the addition of a liquid containing an analyte to the package.
Figure 17:
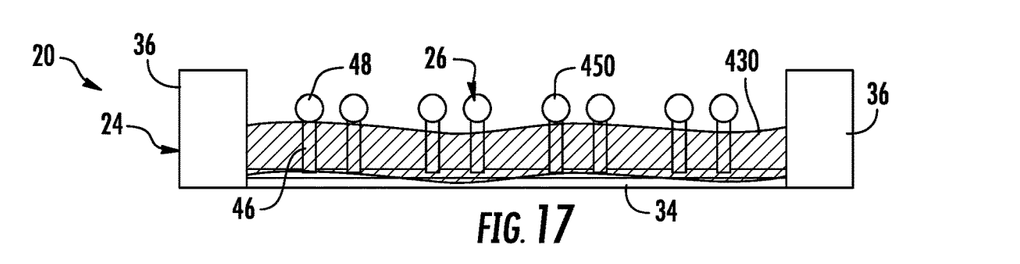
FIG. 17 is a side view of the example package of FIG. 1 during removal of the liquid in the analyte.
Figure 18:
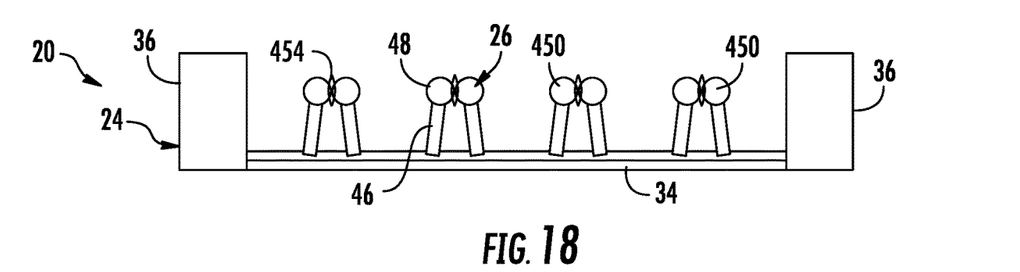
FIG. 18 is a side view of the example package of FIG. 1 illustrating closure of example nano pillars following evaporation of the liquid from the package.

As indicated by block 416 and illustrated by FIG. 16, nano pillars 26 are immersed within a liquid 430 which contains an analyte 450. As indicated by block 420 and illustrated by FIG. 17, after allowing a sufficient time for analyte 450 within chamber 24 to adsorb to surfaces of metallic caps 48, the liquid 330 is withdrawn from chamber 24. As indicated by block 424 and illustrated by FIG. 18, upon withdrawal of liquid 430, any remaining liquid on the surface of nano pillars 26 is evaporated so as to cause posts 46 to bend towards one another under the influence of capillary forces, moving the respective metallic caps 48 into close proximity to one another so as to form "hotspots" 454 therebetween that provide enhanced response to the interrogating light during use of package 20.

Figure 19:
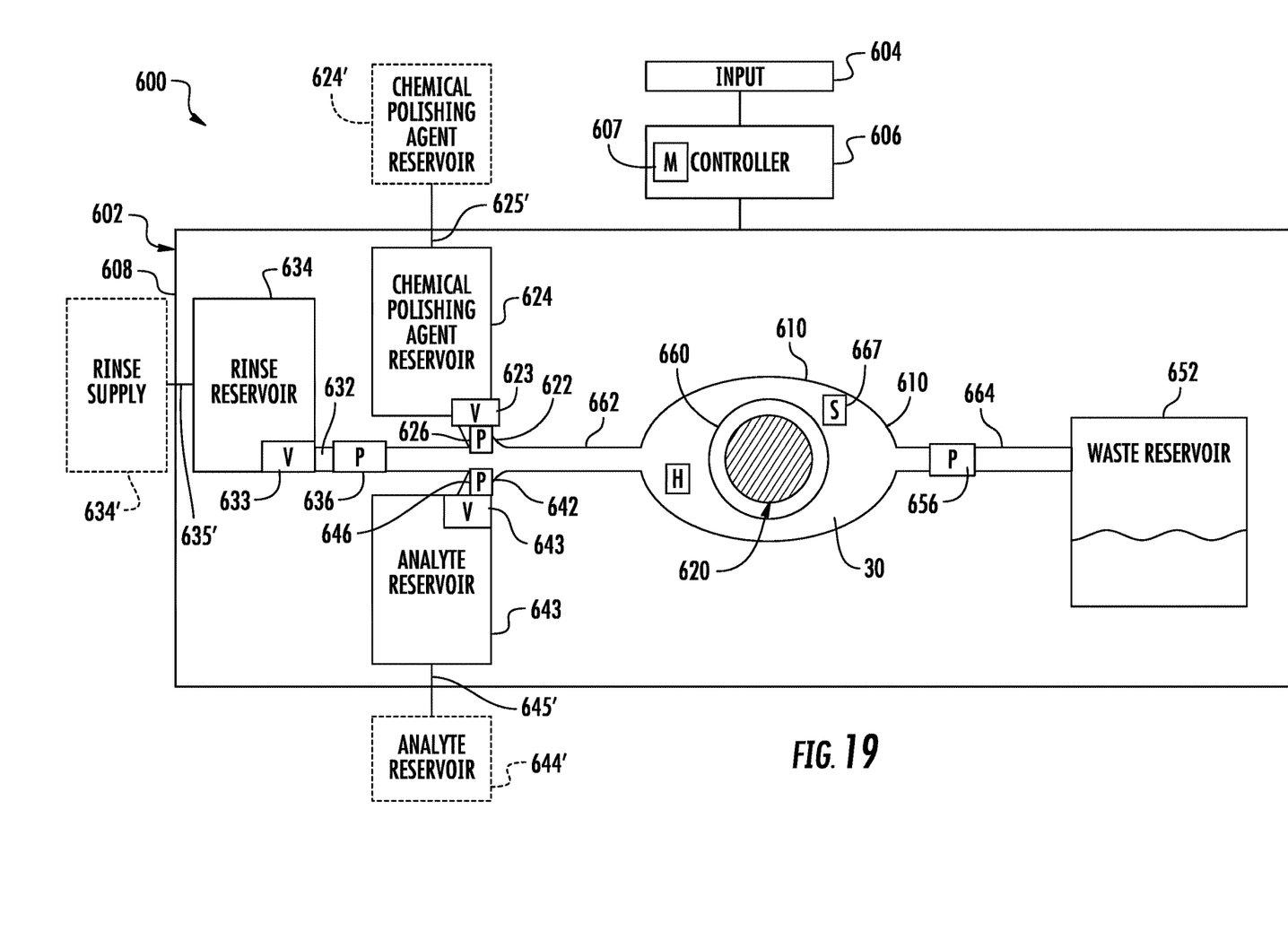
FIG. 19 is a schematic diagram of an example analyte interrogation stage preparation system.

FIG. 19 is a schematic diagram of portions of an example analyte interrogation stage preparation system 600 that facilitates the automated preparation of an analyte interrogation stage for interrogation. System 600 facilitates the automated cleaning or polishing of plasmonic substrate or surfaces for adsorption of analyte. System 600 further facilitates automated adsorption of analyte to the cleaned or polished plasmon it surfaces to prepare such plasmon substrates for interrogation of the analyte. System 600 comprises shipping and storage package 602, input 604 and controller 606.

Shipping and storage package 602 comprises a self-contained unit or module that may be utilized as part of system 602 facilitate the automated polishing and rinsing of the metallic caps of the pillars followed by the automated removal and evaporation of liquids to close the pillars and their metallic caps create "hotspots" for SEL interrogation. Package 602 comprises a body, housing, microfluidic die or body 608 that supports remaining components of package 602. Housing forming a module that facilitates the automated sacrificial coating removal, analyte binding and pillar closing. Body 608 comprises interrogation or sensing chamber 610, SEL analyte interrogation stage 620, chemical polishing agent supply passage 622, chemical polishing agent reservoir 624, rinse supply passage 632, rinse reservoir 634, analyte solution supply passage 642, analyte solution reservoir 644 and waste reservoir 652.

Sensing chamber 610 comprises an internal volume containing SEL analyte interrogation stage 620. Sensing chamber 610 comprises a window 660, an inlet 662 and an outlet 664. Window 660 comprises an opening through which sensing light may be directed onto stage 620, impinging the analyte on the metallic caps of stage 620, and through which light from stage 620 (either reflected, scattered or output) may pass to a sensor. In one implementation, window 660 may comprise an open void. In another implementation, window 660 may comprise an opening covered by a transparent pane or panel.

Inlet 662 comprises a microfluidic passage connected to sensing chamber 610 and connected to each of passages 622, 632 and 642. Outlet 664 comprises a microfluidic passage extending from sensing chamber 610 to waste reservoir 652. Microfluidic passages may be formed by performing etching, microfabrication (e.g., photolithography), micromachining processes, or any combination thereof in a substrate of the fluidic die. Some example substrates may include silicon based substrates, glass based substrates, gallium arsenide based substrates, and/or other such suitable types of substrates for microfabricated devices and structures. Accordingly, microfluidic channels, passages, chambers, orifices, and/or other such features may be defined by surfaces fabricated in the substrate of a fluidic die. Furthermore, as used herein a microfluidic channel or passage may correspond to a channel of sufficiently small size (e.g., of nanometer sized scale, micrometer sized scale, millimeter sized scale, etc.) to facilitate conveyance of small volumes of fluid (e.g., picoliter scale, nanoliter scale, microliter scale, milliliter scale, etc.). Although illustrated as being in alignment with one another on opposite sides of chamber 610, inlet 662 and outlet 664 may have other layouts with respect to sensing chamber 610.

In some implementations, sensing chamber 610 may additionally support a sensor 667 (shown in broken lines). Sensor 667 may comprise an optical sensor that senses a status of stage 620. For example, sensor 667 may sense the polishing state of stage 620 are whether the chemical polishing agent has been sufficiently rinsed away from metallic caps of stage 620. In some implementations, sensor 667 may additionally or alternatively sense a closure state of the metallic caps of stage 620. In yet other implementations, sensor 667 may be omitted.

SEL analyte interrogation stage 620 comprise a plasmonic substrate or surface to facilitate SEL interrogation. In one implementation, the plasma except trader surface may be formed from gold, silver or other metals. In some implementations, stage 620 may be similar to the stage of package 20, having an array 40 of pillars 26 (described above). In one implementation, stage 620 is fixed within sensing chamber 610. In another implementation, stage 620 is removable from sensing chamber 610 through an access opening or door in package 602. In such an implementation, package 602 may be reused by exchanging a used stage 620 for an unused stage 620. During shipping and storage or until use, stage 620 is immersed in liquid 30 (described above) which inhibits contamination of the plasmon excerpts is of stage 620 until use.

Chemical polishing agent inlet passage 622 connects inlet 662 to chemical polishing agent reservoir 624. Chemical polishing agent 624 comprises a reservoir containing a chemical polishing agent for removing the thin outer portion of the plasmonic surface of stage 620. In one implementation in which stage 620 comprises metallic caps, chemical polishing agent reservoir 64 contains a chemical polishing agent that removes a thin outer portion or thickness of metallic caps 38 to polish metallic caps 38. Examples of the chemical polishing agent contain reservoir 64 include, but are not limited to, mixtures of water, potassium iodide and iodine, or mixtures of water, potassium bromide and bromine. In the example illustrated, chemical polishing agent reservoir 624 is selectively connectable to passage 622 by a valve 623 which may be selectively opened and closed by controller 606.

In some implementations, as shown in broken lines, package 602 may additionally comprise a microfluidic pump 626 selectively actuatable by controller 606 to pump fluid from reservoir 624 into sensing chamber 610. For example, in one implementation, pump 626 may comprise an inertial pump. In one implementation, pump 626 may comprise a thermal resistive element that upon being heated, vaporize the adjacent fluid to create a bubble, displacing on vaporize fluid. In some implementations, in which system 602 comprises pump 626, valve 623 may be omitted. As shown in broken lines, in other implementations, system 600 may alternatively utilize an external or remote chemical polishing agent supply reservoir 624' connectable to a port 625' provided in package 602.

Rinse inlet passage 632 connects inlet 662 to rinse supply reservoir 634. Rinse supply reservoir 634 comprises a reservoir containing a rinsing solution for further rinsing and cleaning the plasmon surface of stage 620, such as the metallic caps 48. In one implementation, reservoir 634 may contain a rinsing solution such as ethanol. In the example illustrated, rinse supply reservoir 634 is selectively connectable to passage 622 by a valve 633 which may be selectively opened and closed by controller 606.

In some implementations, as shown in broken lines, package 602 may additionally comprise a microfluidic pump 636 selectively actuatable by controller 606 to pump fluid from reservoir 634 into sensing chamber 610. For example, in one implementation, pump 636 may comprise an inertial pump. In one implementation, pump 636 may comprise a thermal resistive element that upon being heated, vaporizes the adjacent fluid to create a bubble, displacing on vaporize fluid. In some implementations, in which system 602 comprises pump 636, valve 633 may be omitted. As shown in broken lines, in other implementations, system 600 may alternatively utilize an external or remote rinse supply reservoir 634' connectable to a port 635' provided in package 602. In some implementations where rinsing is not performed, passage 632, valve 633 and reservoir 634 may be omitted.

Analyte solution inlet passage 632 connects inlet 662 to analyte solution supply reservoir 644. Analyte solution supply reservoir 644 comprises a reservoir containing a solution caring and analyte to be interrogated. In one implementation, reservoir 644 may comprise an inlet by which an analyte solution may be injected or deposited in reservoir 644. In the example illustrated, analyte solution supply reservoir 644 is selectively connectable to passage 622 by a valve 643 which may be selectively opened and closed by controller 606.

In some implementations, as shown in broken lines, package 602 may additionally comprise a microfluidic pump 646 selectively actuatable by controller 606 to pump fluid from reservoir 644 into sensing chamber 610. For example, in one implementation, pump 646 may comprise an inertial pump. In one implementation, pump 646 may comprise a thermal resistive element that upon being heated, vaporize the adjacent fluid to create a bubble, displacing on vaporize fluid. In some implementations, in which system 602 comprises pump 646, valve 643 may be omitted. As shown in broken lines, in other implementations, system 600 may alternatively utilize an external or remote analyte solution supply reservoir 644' connectable to a port 645' provided in package 602.

Waste reservoir 652 comprises a volume in which fluid is discharged from sensing chamber 610 and transmitted through outlet 664 may be stored until disposal of package 602. In some implementations, as shown in broken lines, package 602 may additionally comprise a microfluidic pump 656 selectively actuatable by controller 606 to pump fluid from sensing chamber 610 into waste reservoir 652 or through a waste discharge port of package 602. For example, in one implementation, pump 626 may comprise an inertial pump. In one implementation, pump 656 may comprise a thermal resistive element that upon being heated, vaporize the adjacent fluid to create a bubble, displacing on vaporize fluid. In other implementations, waste reservoir 652 may alternatively comprise a discharge port through which fluid discharged from sensing chamber 610 through outlet 664 may be discharged.

Input 604 comprises a device by which selections are commands may be provided to controller 606. Input 604 may comprise a keyboard, touchpad, touchscreen, mouse and displayed graphical user interfaces, a microphone with associated speech recognition or the like.

Controller 606 comprises a device that controls the operation of valves 623, 633 and 643 to prepare and use stage 620. In one implementation, controller 606 carries out method 400 described above. Controller 606 may comprise a processing unit that follows instructions contained in a non-transitory computer-readable medium 607 for carrying out method 400. In one implementation, controller 606, upon receiving a start command through input 604, actuates valve 623 and/or actuates pump 626 to direct the chemical polishing agent within reservoir 624 or through port 625' into sensing chamber 610. Following a predetermined amount of time or upon sensing is efficient removal of the outer thickness of the plasmonic surfaces of stage 620 by sensor 667, controller 606 may discharge the chemical polishing agent in the storage liquid from sensing chamber 610 by actuating pump 656.

Once liquid 30 and the chemical polishing agent have been withdrawn, controller 606 may output control signals actuating valve 633 and/or pump 636 to direct the rinse solution in reservoir 634 into sensing chamber 610. In one implementation, the rinse solution is passed through and across stage 620 directly into waste reservoir 652. In another implementation, stage 620 is permitted to soak in the rinse solution prior to the discharge of the rinse solution into waste reservoir 652 by pump 656 in response to signals from controller 606.

Following the withdrawal of the rinsing solution from sensing chamber 610, such as being sensed by sensor 667, controller 606 may output control signals actuating valve 643 and/or pump 646 to direct analyte solution contained within reservoir 644 into sensing chamber 610. Following a sufficient incubation time to allow the analyte to bind to the metallic caps of stage 620, controller 606 may output control signals actuating pump 656 to withdraw the analyte solution into waste reservoir 652 or three with discharge port. Thereafter, evaporation of any remaining analyte solution may result in capillary forces that close the metallic caps of stage 620, readying the analyte bound on stage 6204 interrogation through window 660. In some implementations, package 602 may additionally comprise a heater 667 within or adjacent to sensing chamber 610, such as a resistive heater, which may be selectively actuated by controller 606 to accelerate the drying and evaporation of the remaining analyte solution within sensing chamber 6102 accelerate closing of the metallic caps of stage 620.

In some implementations, the instructions contained in the non-transitory computer-readable medium 607 of controller 606 may prompt a user to identify characteristics of stage 620, characteristics of the chemical polishing agent being used, characteristics of the rinse solution being used and/or characteristics of the analyte solution or analyte, wherein controller 606 consults a lookup table or other memory which identifies predetermined times for sufficiently polishing the plasmonic surfaces of stage 620, sufficient time for adequately rinsing stage 620 and sufficient time for incubating the analyte for binding of analyte to stage 620.

In one implementation, controller 606 and its associated input 604 are releasably connectable to package 602, wherein input 604 and controller 606 may be utilized with interchangeable packages 602. For example, in one implementation, package 602 may comprise at least one of contact pads, pins or other connection interfaces by which controller 606 may be releasably connected to package 602 and make electrical signal connection with each of valves 623, 633, 643, pumps 626, 636, 646, 656, sensor 667 or heater 669. In other implementations, input 604 and controller 606 may alternatively be provided as part of package 602.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A surface enhanced luminescence analyte interrogation stage shipping and storage package comprising:
   a sealed chamber;
   a liquid contained within the sealed chamber; and
   nano pillars within the sealed chamber and submersed within the liquid, wherein the nano pillars comprise polymer posts and metallic caps forming tips of the nano pillars, wherein the metallic caps of the nanopillars are submersed in the liquid and the liquid is devoid of chemicals that contaminate the metallic caps or interact with the metallic caps or the polymer posts so as to degrade the metallic caps or the polymer posts to produce chemicals that contaminate the metallic caps.

2. The package of claim 1, wherein the nano pillars each have functionalized tips.

3. The package of claim 1, wherein the liquid has properties such that, upon being evaporated, cause tips of the nano pillars to draw closer to one another.

4. The package of claim 1, wherein the liquid is to facilitate binding of an analyte to tips of the nano pillars.

5. The package of claim 1, wherein the nano pillars are spaced from one another and are sufficiently flexible so as to draw to within 1 μm of one another in response to capillary forces during evaporation of the liquid about the nano pillars.

6. The package of claim 1 further comprising:
a waste reservoir connectable to the sealed chamber; and
a sealed reservoir of a second liquid connectable to the sealed chamber.

7. The package of claim 1, further comprising a sealed reservoir of a third liquid connectable to the sealed chamber, the third liquid to polish tips of the nano pillars.

8. A method for forming a surface enhanced luminescence analyte interrogation stage shipping and storage package, the method comprising:
immersing nano pillars in a liquid;
sealing the immersed nano pillars within a chamber of a surface enhanced luminescence shipping and storage package, wherein the nano pillars comprise polymer posts and metallic caps forming tips of the nano pillars;
opening the chamber;
adding a chemical agent to the liquid, wherein the chemical agent removes a portion of the metallic caps to polish the metallic caps;
removing the liquid with the chemical agent from the chamber;
immersing the nano pillars with a second liquid containing an analyte;
withdrawing the second liquid from the chamber; and
evaporating the second liquid on the nano pillars to draw the nano pillars towards one another through capillary forces.

9. The method of claim 8 further comprising:
opening the chamber;
adding an analyte to the liquid;
withdrawing the liquid from the chamber; and
evaporating the liquid on the nano pillars to draw the nano pillars towards one another through capillary forces.

10. The method of claim 9 further comprising functionalizing tips of the nano pillars prior to the immersion of the nano pillars in the liquid.

11. The method of claim 8 further comprising:
opening the chamber;
withdrawing the liquid from the chamber;
immersing the nano pillars with a second liquid;
adding an analyte to the second liquid;
withdrawing the second liquid from the chamber; and
evaporating the second liquid on the nano pillars to draw the nano pillars towards one another through capillary forces.

12. The method of claim 8 further comprising:
opening the chamber;
adding an analyte to the liquid;
withdrawing the liquid from the chamber;
immersing the nano pillars with a second liquid;
withdrawing the second liquid from the chamber; and
evaporating the second liquid on the nano pillars to draw the nano pillars towards one another through capillary forces.

13. A surface enhanced luminescence analyte interrogation stage shipping and storage package comprising:
a sealed chamber having an inlet and an outlet;
a liquid contained within the sealed chamber; and
a plasmonic substrate immersed within the liquid;
a sealed reservoir of a polishing liquid connectable to the inlet of the sealed chamber, the polishing liquid is to remove a portion of the plasmonic substrate to polish the plasmonic substrate.

14. The package of claim 13 further comprising a waste reservoir connectable to the outlet of the sealed chamber.

* * * * *